Aug. 28, 1951  E. E. WEISMANTEL  2,565,793
VACUUM HOLDING MAT
Filed July 18, 1949
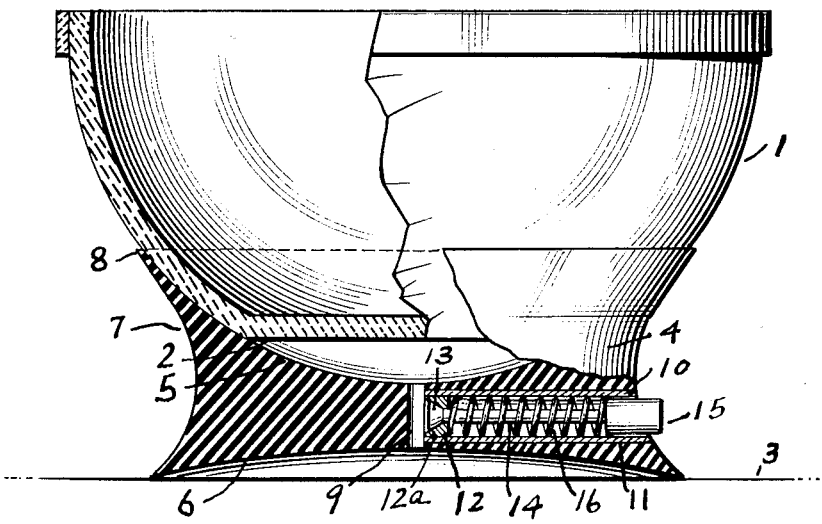
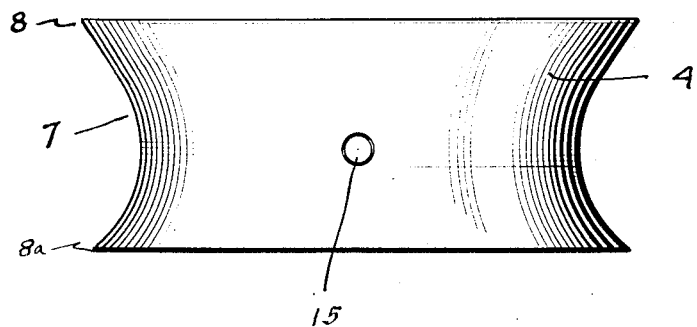
INVENTOR.
Ellen E. Weismantel
BY
E. V. Hardway
ATTORNEY Patented Aug. 28, 1951

2,565,793

UNITED STATES PATENT OFFICE 2,565,793

VACUUM HOLDING MAT

Ellen E. Weismantel, Houston, Tex.

Application July 18, 1949, Serial No. 105,375

7 Claims. (Cl. 248—362)

This invention relates to a vacuum holding mat.

The invention is particularly adapted to provide suction means to firmly hold a kitchen bowl to a flat surface usually found in a kitchen, thus giving the housewife a free hand which she may use for another purpose other than to hold the bowl in order to keep it from moving.

Another object of the invention is to provide a holding mat formed of soft rubber or the like having opposed concave surfaces, the top surface being of a lesser radius than the bottom of the mixing bowl which it is designed to grip by a partial vacuum, and the bottom surface being adapted to grip a flat surface, also by a partial vacuum, in order to hold the assembly firmly to the flat surface.

Another object is to provide a holding mat as mentioned above which has a valve assembly to admit air into said concavities to release the vacuum therein and thus provide means whereby the mat and bowl assembly may be easily and quickly detached.

Another object of the invention is to provide a marginal groove around the holding mat to provide a lip to allow the bowl to be tipped if desired.

Other objects and advantages of this invention will become apparent from the following description taken in connection with the accompanying drawing, wherein is set forth by way of example and illustration one embodiment of this invention. It is to be understood that this drawing and description are not to be taken by way of limitation and that the scope of this invention is to be limited only by the prior art and by the terms of the appended claims.

In the drawing:

Figure 1 is a side elevation partly in section, showing the mat gripping the bowl and the flat surface; and Figure 2 is a side elevational view of the mat.

Referring now more in detail to the drawing, the numeral 1 designates a mixing bowl commonly used in the kitchen which has a flat bottom 2 to enable the upper concavity, as hereinafter set forth, to grip the bottom of the bowl by vacuum. However, if the bottom of the bowl is in the form of a true sphere it will be necessary to deepen or provide a recess in the upper concavity to enable the bowl to be gripped by vacuum.

The numeral 3 designates any flat surface such as a table or the like usually found in the kitchen on which work for preparing food is performed.

The numeral 4 designates a disc-shaped mat or body which is molded from a solid piece of soft rubber. The top and bottom surfaces of the mat are concave, as shown at 5 and 6, respectively. The margin of the mat has the annular groove 7 therearound, the purpose of which is to provide the lips 8 and 8a so that the bowl may be tipped and held at an angle. These lips or feathered edges at the rims of the upper and lower concavities 5 and 6 are very flexible, and the elongated lip 8 is specially adapted to grip the bowl at any angle up to about 45°.

There is formed in the mat the central vertical air passageway 9 which connects the top and bottom concave surfaces, and, leading from such passageway, there is the enlarged passageway 10 which extends radially through the mat from about the center of the passageway 9 to the outside.

A tubular metal housing 11 is provided to be inserted in the outer end of the passageway 10, and, located in the inner end of the housing 11, there is the ring 12 which has an inwardly flared valve seat 12a which is formed to receive the valve 13 that is connected to the inner end of the stem 14. Connected to the outer end of the stem 14 there is the thumb button 15 which is of less diameter and fits partly within the housing 11. The button 15 extends beyond the dished margin of the mat 4. A relatively strong coil spring 16 is disposed around the stem 14 and is located between the ring 12 and inner end of the button 15 and provided to normally hold the valve closed.

The operation and use of my device is obvious.

When it is desired to assemble the bowl and the mat, the bowl 1 is forced into the upper concavity 5 by a medium pressure being downwardly exerted upon the bowl. As this pressure is released the bowl will be held by a partial vacuum created between the bottom thereof and the remaining space in such concavity. At the same time, the lower concavity 6 is forced against the kitchen table or the like by the pressure being exerted upon the bowl, and, thus, the entire assembly is held to such flat surface by the partial vacuum created between it and the lower concavity.

When the bowl and mat are thus assembled, for mixing purposes, the valve 13 is held firmly seated against the tapered seat 12a by the force of the pressure in the concavities and by the spring 16. In order to release this pressure or vacuum, the thumb button 15 may be pushed inwardly to permit air to enter into the passageway 10. The air will continue around and through the space provided between the valve 13 and the seat 12a when such elements are separated due to the inwardly push on the button 15. The air is then admitted into the passageway 9 and thence into both of the concavities, thus equalizing the pressure therein with that on the outside and thereby releasing both the bowl from the mat and the mat from the flat surface.

The bowl may be tilted by virtue of the elongated, circumferential lip 8 provided by the marginal groove 7 around the body 2. The advantage of the tipping of the bowl is obvious.

What I claim is:

1. A mat which is concaved on its under side and formed with an annular flexible lip to seal with a supporting surface and concaved on its upper side and formed with an annular, flexible lip to seal with a container seated in said upper concavity, said concavities being connected by an air passageway, said mat having a radial air passageway communicating with the connecting passageway and valve means normally closing the radial passageway.

2. A vacuum holding device comprising, a flexible, disc-shaped body, said body having upper and lower concavities formed therein and an air passageway connecting said concavities and leading from an opening in the outer surface of the body, said upper concavity being adapted to receive and hold by vacuum a bowl, and the lower concavity being adapted to grip by vacuum a flat surface when pressure is downwardly exerted upon the bowl and means closing the passageway and operable to admit air to the passageway.

3. A vacuum holding device comprising, a flexible, disc-shaped body, said body having upper and lower concavities formed therein and a vertical air passageway connecting said concavities, and also a radial passageway leading from the connecting passageway to the outside, said upper concavity being adapted to receive a mixing bowl, and the lower concavity being adapted to grip by vacuum a flat surface when pressure is downwardly exerted upon the bowl, and release means inserted in said radial passageway to admit air into the passageways.

4. A flexible vacuum holding mat having a concavity in its under side adapted to seal with a supporting surface and having a concavity in its upper surface adapted to seal with a container seated on the mat, said mat having a passageway communicating with the cavities and opening outwardly of the mat at a point spaced from the cavities and release means in the passageway to admit air into the passageway.

5. A flexible vacuum holding mat having a concavity in its under side adapted to seal with a supporting surface and having a concavity in its upper surface adapted to seal with a container seated on the mat, said mat having outwardly opening passageway between said sides, valve means closing the passageway and operable to admit air to the cavities.

6. A vacuum holding device comprising a flexible, disc-shaped body, said body having upper and lower concavities formed therein and a passageway communicating with the concavities and opening outwardly of the body, between the cavities valve means in the passageway and closing the same, and means operable in the passageway to open the valve.

7. A vacuum holding device comprising, a flexible, disc-shaped body having oppositely disposed concavities formed therein and a passageway communicating with the concavities and opening outwardly of the body mediate the concavities, a valve in the passageway, means in the passageway urging the valve into closed position, and means in the passageway extending outwardly of the body and operable to open the valve.

ELLEN E. WEISMANTEL.

REFERENCES CITED

The following references are of record in the file of this patent:

UNITED STATES PATENTS

| Number | Name | Date |
|---|---|---|
| 1,513,841 | McDonald | Nov. 4, 1924 |
| 1,753,611 | Lower | Apr. 8, 1930 |
| 2,083,299 | Hunter | June 8, 1937 |
| 2,175,941 | Keays | Oct. 10, 1939 |